Patented June 7, 1949

2,472,277

UNITED STATES PATENT OFFICE 2,472,277

MONOSUBSTITUTED DESOXYGLYCOSES AND PROCESS FOR PREPARING THE SAME

William Andrew Bonner, Hubbard Woods, and Charles D. Hurd, Evanston, Ill., assignors to Corn Products Refining Company, New York, N. Y., a corporation of New Jersey No Drawing. Application December 31, 1945, Serial No. 638,585

12 Claims. (Cl. 260—333)

This invention relates to a new class of organic chemical compounds. More particularly it relates to monosubstituted desoxyglycoses, wherein the substituent group may be alkyl, aryl or aralkyl and is attached to the carbon atom of the glycose skeleton, it being understood that in aldoses the number one carbon atom refers to the reducing group or reducing end of the molecule, and to the process of preparing such desoxyglycoses. For convenience of reference herein these monosubstituted desoxyglycoses will be referred to hereinafter as 1-R-1-desoxyglycoses, it being understood that the R represents an alkyl, aryl, or aralkyl group.

The compounds of our invention may be represented by the general formula

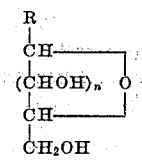

wherein R may be either an alkyl, aryl, or aralkyl group and n is a whole number, usually 3 or 4.

A specific example of a 1-R-1-desoxyglycose obtained by the process of the present invention is beta - D - glucopyranosylbenzene. An alternate name for this compound is 1-phenyl-1-desoxyglucose. The structural formula for this compound may be represented as follows:

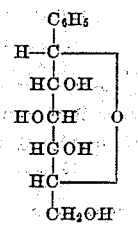

A specific example of a derivative of a 1-R-1-desoxyglycose obtained by the process of the present invention is tetraacetyl-beta-D-glucopyranosylbenzene. Two alternate names are 1-phenyl - 1 - desoxy - 2,3,4,6 - tetraacetyl - beta-D-glucose and 2,3,4,6-tetraacetyl-1-phenyl-1,6-anhydro-D-glucitol. The structural formula therefor may be represented as follows:

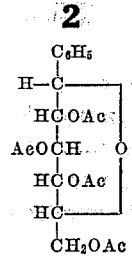

Further examples of the products of our invention include the alpha and beta isomers of:

p-(Tetraacetyl-D-glucopyranosyl)toluene
p-(D-glucopyranosyl)toluene or 1-p-tolyl-1-desoxy-D-glucose
p-(Tetraacetyl-D-glucopyranosyl)naphthalene
p-(D-glucopyranosylnaphthalene)
1-(Tetraacetyl-D-glucopyranosyl)butane
1-butyl-1-desoxy-D-glucose
Triacetyl-D-xylopyranosylbenzene
1-phenyl-1-desoxy-D-xylose
p-(Triacetyl-D-xylopyranosyl)toluene
p-(D-xylopyranosyl)toluene
Heptaacetyllactopyranosylbenzene
Lactopyranosylbenzene Aryldesoxyglycoses may be prepared by bringing about the reaction between certain carbohydrate derivatives and an aromatic hydrocarbon in the presence of aluminum chloride. Such a process of making such compounds is disclosed and claimed in co-pending application Serial No. 638,583, filed December 31, 1945.

However, the yields of such compounds obtained by practice of this method are not as high as might be desired and the isolation of the products is somewhat complicated.

An object of the present invention is to provide a new series of compounds, i. e., 1-R-1-desoxyglycoses. A further object is to provide an efficient process for the preparation thereof in substantial yields.

These objects are accomplished by bringing about the reaction between a suitable Grignard reagent and a polyacylglycosyl halide or polyacylglycosyl ester or equivalent and the like.

Several attempts to effect the reaction between such carbohydrate derivatives and Grignard reagents have been recorded in the literature, but these have been failures. (Paal and Hörnstein, Ber., 39, 1361, 2823 (1906); Fischer and Hess, ibid., 45, 912 (1912); Fröschl, Zellner and Zak, Monatsh., 55, 25 (1930)). In contrast to the negative results of previous workers, the present invention provides a means for bringing about the interaction of Grignard reagents and polyacylglycosyl halides or polyacylglycosyl acetate or equivalent carbohydrate and the like.

The reaction between carbohydrate derivatives such as above specified and a Grignard reagent is believed to proceed according to the following illustrative equation involving the use, in this instance, of a polyacetylglucosyl derivative:

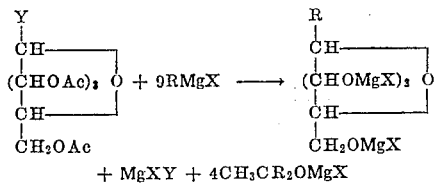

$$+ MgXY + 4CH_3CR_2OMgX$$

wherein R may be an alkyl, aryl or aralkyl group; X represents a halogen atom, and Y represents a halide or acyloxy radical.

Hydrolysis of the reaction products produces

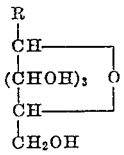

a monosubstituted desoxyglycose and $CH_3CR_2OH$, a tertiary alcohol.

In carrying out the present invention there may be used any glycosyl halide or ester having protected hydroxyl groups. Polyacylglycosyl halides are particularly satisfactory. Among these which may be used are 2,3,4,6-tetraacetylglucosyl chloride, 2,3,4-triacetylxylosyl chloride, heptaacetyllactosyl chloride. Polyacylglycoses, such as glucose pentaacetate, may also be used. In fact there may be used any carbohydrate derivative containing an aldehydic or ketonic function, the carbon atom of which has attached to it a group Y; Y may be chlorine, bromine or an acyloxy group. The term carbohydrate derivative as used herein and in the appended claims is intended to refer to a compound obtained from the carbohydrate, wherein the skeleton of the carbohydrate (i. e., the carbon chain) remains substantially intact. The term derivative is thus to be distinguished from a modification in which the original carbohydrate skeleton may be degraded or increased or otherwise changed. The term acyloxy as used herein and in the appended claims is intended to refer to an acyl group holding an oxygen.

In carrying out the present invention there may be used an alkyl, aryl, or aralkyl Grignard reagent. Among those which may be used are phenylmagnesium bromide, p-tolylmagnesium bromide, 1-naphthylmagnesium bromide, n-butylmagnesium bromide, 1-propyl-magnesium bromide, benzylmagnesium chloride, and the like.

The process of the present invention is carried out in accordance with the general principles of the reaction between an alkyl, aryl, or aralkyl halide and the Grignard reagent. The Grignard reagent is prepared in known manner in dry ethyl ether. To this in suitable equipment and at about room temperature (about 25° C. to 35° C.) is then added slowly and with stirring a solution in ether or other inert solvent of the carbohydrate derivative to be used as one of the reactants. Usually the reaction starts at room temperature and there is soon formed a heavy precipitate. After all of the carbohydrate derivative reactant has been added, the mixture is heated under reflux conditions, as by means of a steam bath, for several hours. The mixture is then cooled and the ether decanted into water. The resultant ether layer is separated from the aqueous layer. From the ether layer is obtained a tertiary alcohol, as a by-product.

To the water layer which contains the 1-R-1-desoxyglycose is added an alkaline substance, such as sodium hydroxide, to adjust the pH value to about 7.0. Thereafter the water layer is evaporated to dryness. The sirup remaining contains the 1-R-1-desoxyglycose and inorganic salts. Due to its extreme solubility in water, the 1-R-1-desoxyglycose is preferably isolated from the sirup in the form of a suitable derivative, such as the acetate. This is formed by adding to the sirup acetic anhydride and sodium acetate and treating the mixture in accordance with well known procedures for acetylation. In some instances, it may be necessary to take precautions to control the acetylation reaction in order to avoid frothing over. After the acetylation reaction is complete, the reaction mixture is cooled and poured into water to hydrolyze the excess anhydride. The addition of water usually precipitates the acetylated desoxyglycoses. The whole mixture is now subjected to extraction with a suitable solvent such as ethyl ether. Removal of the ether from the resultant ether extract leaves a solid material or sirup, which is a mixture of the alpha and beta isomers of the acetate of the desired 1-R-1-desoxyglycose. The isomers are separated by fractional crystallization from a suitable solvent, such as 2-propanol. If desired the isomers may be deacetylated in known manner with sodium and methanol, leaving the alpha or beta isomer of 1-R-desoxyglycose.

An alternative method for isolation of the alpha and beta forms of the 1-R-1-desoxyglycose derivative, in the event a solid is precipitated when water is added to decompose excess acetic anhydride, as above mentioned, consists of filtration of the solid. The alpha and beta isomers may then be separated from each other by fractional crystallization from a suitable solvent.

The amount of Grignard reagent required to effect the reaction involved in the present invention will depend upon the type of carbohydrate derivative used as a reactant. If, for example, a polyacylglycosyl halide or acetate is used as a reactant, the acyl groups of such reactant will also react with the Grignard reagent. In such case there must be sufficient Grignard reagent to provide at least one molecular equivalent for each halogen atom or acylal group after the acyl groups are satisfied. The amount of Grignard reagent necessary for polyacylglycosyl halides or acetates is $2x+1$ molecular equivalents, wherein $x$ equals the number of acyl groups. Some substituent groups may not require 2 molecular equivalents. In any case, however, it is necessary to provide sufficient Grignard reagent so that the desired reaction may be effected. If an excess, i. e., about 3 to 5 molecular equivalents of the Grignard reagent in addition to the amount above specified are used the results are more satisfactory. There is no particular advantage, however, in using more than the above specified excess of the Grignard reagent.

The carbohydrate derivative should be at least partially, if not completely, soluble in ether, or benzene, so as to permit the reaction with the Grignard reagent.

Any vessel which is provided with means for refluxing, means for agitation, and means for gradual addition of a solution is suitable for carrying out the process of the present invention.

The time required for the reaction to take place will depend upon the individual reactants present, but generally a total time of 3 to 5 hours is satisfactory in carrying out the present invention.

As already indicated two anomers of 1-R-1-desoxyglycoses, i. e., both an alpha and beta modification, are formed during the process of the present invention. This is true regardless of which isomer of the carbohydrate reactant is used. The beta isomer is usually obtained in crystalline form while the alpha isomer is usually obtained in sirupy form. The crystalline beta isomer usually predominates. The term anomer as used herein means stereoisomers of sugars and sugar derivatives differing from each other in the spacial position of groups attached to the reducing carbon atom.

Other derivatives, such as the propionate, butyrate and the like, may also be used to isolate the desired 1-R-1-desoxyglycose.

Solvents other than 2-propanol which may be used to separate the isomers of the acetates or like derivatives of 1-R-1-desoxyglycoses by fractional crystallization include methanol, ethanol, ethyl acetate, and the like. Such solvents may also be used to purify any of these compounds further, if desired.

Deacetylation of the acetylated products leaves the 1-R-1-desoxyglycose in the form of a sirup or solid. The solid product may be purified with 2-propanol, ethyl acetate, and the like.

The following examples which are intended as informative and typical only and not in a limiting sense will further illustrate the invention, which is intended to be limited only in accordance with the scope of the appended claims.

*Example 1.—Preparation of tetraacetyl-D-glucopyranosylbenzene.* A solution of phenylmagnesium bromide was prepared in conventional manner from 7.0 g. (0.291 mole) of magnesium turnings, 30.5 g. of bromobenzene, and 150 ml. of absolute ethyl ether. A three necked flask equipped with a mercury seal and with means for agitation, for addition of solution, and for refluxing was used for the preparation of the Grignard reagent and subsequent reaction thereof with a polyacylglycosyl halide. To the above solution at room temperature was added dropwise during a period of about 2 hours a solution of 10 g. of 2,3,4,6-tetraacetyl-D-glucosyl bromide dissolved in 100 ml. of dry ether. The reaction began within about 45 minutes after the addition of the tetraacetyl-D-glycosyl bromide. Thereafter the mixture was maintained under reflux conditions and with stirring for 4 hours and 30 minutes longer. A strong stirring device was required to offset the heavy precipitate which settled during the first hour of the reaction. After the reaction was complete, the bulk of the absolute ether was separated from the reaction mixture by distillation and kept dry for subsequent use. The residue remaining was decomposed carefully with pieces of ice, after which 25 ml. of acetic acid was added to dissolve the suspended solid. Then ordinary ethyl ether was added for extraction purposes and the two layers which formed were separated.

From the ether layer was recovered almost a quantitative yield of methyldiphenylcarbinol (20 g.): M. P. 79.5–80.5° C.

To the water layer was added sodium hydroxide solution until the pH value was adjusted to 7.0. Then the water was removed by distillation under diminished pressure. The sirup remaining contained D-glycopyranosylbenzene. The sirup was acetylated by adding thereto 200 ml. of acetic anhydride and 5 to 10 g. of sodium acetate and heating the mixture on the steam bath for 2 to 3 hours, constant agitation being maintained. Then the mixture was poured into 300 to 500 ml. of cold water. This caused the separation of a white solid. The whole mixture was treated with ethyl ether to extract the acetylated product therefrom. After removal of the ether from the extract there remained 7.4 g. of acetylated product (74.5% yield) in solid form. This was dissolved in hot 2-propanol and the solution allowed to cool. Crystalline tetraacetyl-beta-D-glycopyranosylbenzene separated readily upon cooling. The quantity obtained was 5.60 g. The melting point of the product after recrystallization from 2-propanol was found to be 156.5° C. and $(\alpha)_D^{20}$ in chloroform, $-18.6°$, (conc. 2.010 g./100 ml.) of chloroform.

The filtrate remaining after the crystals were removed was evaporated under vacuum to dryness. There was obtained 1.8 g. of an amber sirup which was essentially all tetraacetyl-alpha-D-glucopyranosylbenzene. The sirup could not be crystallized. Oxidation of each of the isomers with alkaline permanganate resulted in benzoic acid from each isomer. $(\alpha)_D^{20}$ of the sirup in chloroform was $+39.8°$.

*Example 2.—Preparation of tetraacetyl-D-glucopyranosylbenzene.* Phenylmagnesium bromide was made in dry ether (70 ml.) from magnesium turnings (3.93 g., 0.1615 mole) and bromobenzene (17.3 ml.; 0.1650 mole) using a three necked flask equipped with stirrer, mercury seal, and a reflux condenser protected by a calcium chloride tube. The Grignard solution was stirred under reflux for an additional 15 to 30 minutes after completion of the reaction. Heating was discontinued and a solution of 2,3,4,6-tetraacetyl-alpha-D-glucosyl chloride (5.00 g.; 0.0136 mole) in dry ether (70 ml.) was added with stirring over the course of an hour. The mixture was stirred under reflux for an additional four to five hours. The mixture was then cooled and the ether decanted therefrom into cold water. The gummy residue was decomposed by the cautious addition of water, and the last traces removed with a small quantity of acetic acid, these washings being combined with the previous two phase system of ether and water. The two phases were shaken well, filtered over a filter aid and separated. The ether layer was washed with water and the water layer with ether, the washings being combined with the appropriate phases.

The ether layer was dried over anhydrous sodium sulfate and decolorized by filtration through a bed of decolorizing carbon supported on a bed of filter aid. Removal of the solvent at 100° C., finally under diminished pressure, left 11.5 grams (slightly over the theoretical weight) of crude methyldiphenylcarbinol. This was recrystallized at 15° C. from a mixture of ethyl ether and petroleum ether to give crystals melting at 78–79°, and showing no mixed melting point depression with an authentic sample.

The pH value of the water layer from the reaction was adjusted to 7.0 with sodium hydroxide solution, and then concentrated to dryness in vacuo on the steam bath. Acetylation of the residue which contained D-glucopyranosylbenzene was accomplished by adding thereto acetic anhydride (150 ml.) and sodium acetate (5 g.) and heating and stirring the mixture at 100° C. for 3 hours. (Care was exercised at the start of the acetylation to keep the vigor of the reaction under control and to avoid frothing over.) The acetylation mixture was then cooled, poured into about 200 ml. of cold water and stirred for several hours to hydrolyze the excess anhydride. The precipitate which formed was extracted into ether and the extract was washed with water, saturated sodium bicarbonate solution (until gas evolution ceased), and again with water. It was then dried over sodium sulfate and decolorized by filtration through a decolorizing carbon. Removal of the solvent left 4.57 g. (82%) of a mixture of alpha- and beta-tetraacetyl-D-glucopyranosylbenzenes in solid form. Crystallization from the minimal quantity of 2-propanol gave 3.28 g. of the beta-modification, M. P. 153–154°. By concentration of the mother liquors to dryness in vacuo at 100° there was obtained 0.81 g. of an amber sirup, the alpha-isomer. This could not be crystallized. $(\alpha)_D^{20}$ of the sirup in chloroform was found to be +39.9°.

*Example 3.*—*Preparation of p-(tetraacetyl-D-glucopyranosyl)toluene.* p-Tolylmagnesium bromide was prepared in absolute ethyl ether from p-bromotoluene (56.1 g.) and magnesium (7.9 g.). To this was added over a period of 90 minutes a solution of 10.0 g. of 2,3,4,6-tetraacetyl-D-glucosyl chloride in 150 ml. of dry ethyl ether. The mixture was then heated under reflux conditions for 4 hours.

After the reaction was complete the mixture was treated as in Example 1 for the recovery of the desired products.

From the ether layer was obtained a new carbinol, di-p-tolylmethylcarbinol.

From the water layer, after evaporation and acetylation, there was obtained 8.65 g. (75%) of crude acetylated product. This was crystallized from 2-propanol. There was obtained from this 6.4 g. of crystalline p-(tetraacetyl-beta-D-glucopyranosyl)toluene (after crystallization twice from 2-propanol M. P. 138.5° C. and $(\alpha)_D^{20}$ in chloroform −42.8°, conc. 1.122 g./100 ml. of chloroform) and 2.3 parts of p-(tetraacetyl-alpha-D-glucopyranosyl)toluene in the form of a sirup ($(\alpha)_D^{20}$ in chloroform +40.0°) which could not be crystallized.

Oxidation of each isomer with alkaline permanganate resulted in 4,4'-benzophenonedicarboxylic acid.

*Example 4.*—*Preparation of 1-(tetraacetyl-D-glucopyranosyl)naphthalene.* The procedure was similar to that of Example 1. The Grignard reagent was prepared from 1-bromonaphthalene. The quantities of the reactants used were:

| | | |
|---|---|---|
| 1-Bromonaphthalene | ml. | 53.2 |
| Magnesium | g. | 9.16 |
| Tetraacetylglucosyl chloride | g. | 10.0 |

There was obtained 8.1 g. (65%) of tetraacetyl-D-glucopyranosylnaphthalene in solid form. Fractionation of this from 2-propanol resulted in 5.4 g. of 1-(tetraacetyl-beta-D-glucopyranosyl)-naphthalene (after three recrystallizations from 2-propanol, M. P. 186.5–187° C.; $(\alpha)_D^{20}$ in chloroform +1.25°, conc. 0.718 g./100 ml. of chloroform) and 2.7 parts of 1-(tetraacetyl-alpha-D-glucopyranosyl)naphthalene in the form of a sirup ($(\alpha)_D^{20}$ in chloroform +95.4°) which could not be crystallized.

*Example 5.*—*Preparation of 1-(tetraacetyl-D-glucopyranosyl)butane.* The procedure was similar to that of previous examples. The Grignard reagent was prepared from 9.16 g. of magnesium and 35.3 g. of n-butyl bromide in 140 ml. of dry ethyl ether. Then 10 g. of 2,3,4,6-tetraacetyl-D-glucosyl chloride in 105 ml. of dry ethyl ether was added during 45 minutes. The supplementary refluxing period was 5 hours.

There was obtained 16.5 of methyldi-n-butylcarbinol, and 6.26 g. (59.4%) of tetraacetyl-D-glucopyranosylbutane in the form of a sirup which crystallized partially on standing. The material could not be crystallized from 2-propanol so it was dissolved in a mixture of approximately equal parts of ethyl ether and hexane. The material which crystallized was identified as 1-(tetraacetyl-alpha-D-glucopyranosyl)butane. The melting point thereof after three crystallizations from the same solvent was found to be 109–109.5° C. and $(\alpha)_D^{20}$ in chloroform +77.2°. (Conc. 1.050 g./100 ml. of chloroform.)

After the alpha isomer was filtered off, the solvent was removed from the filtrate. The remaining sirup was identified as the beta isomer, $(\alpha)_D^{20}$ in chloroform +3.52°.

*Example 6.*—*Preparation of 2-(tetraacetyl-D-glucopyranosyl)propane.* The procedure was similar to that used in previous examples. The Grignard reagent was prepared from 54 g. of isopropyl bromide, 10.5 g. of magnesium in 175 ml. of absolute ethyl ether. Ten parts of tetraacetyl-D-glucosyl bromide in 150 ml. of dry ether was added to the Grignard reagent in the manner previously described. There was obtained 7.2 g. of methyldiisopropylcarbinol and 4.4 g. (43%) of 2-(tetraacetyl-D-glucopyranosyl)propane in the form of an oil.

*Example 7.*—*Preparation of 1-benzyl-1-desoxy-2,3,4,6-tetraacetyl-D-glucose.* The procedure was similar to that used in previous examples. From 56.3 g. of benzylmagnesium chloride and 5 g. of tetraacetylglucosyl bromide, there was obtained 3.72 g. (72.5%) of 1-benzyl-1-desoxy-D-glucose tetraacetate in the form of a sirup which would not crystallize.

*Example 8.*—*Preparation of triacetyl-D-xylopyranosylbenzene.* A solution of phenylmagnesium bromide was perpared from 4.13 g. of magnesium, 17.8 ml. of bromobenzene and 70 ml. of absolute ethyl ether. To this was added during an hour 5 g. of 2,3,4-triacetyl-D-xylosyl chloride in 70 ml. of absolute ethyl ether. Stirring became difficult because of gummy products. Stirring was discontinued and the mixture allowed to stand for 5 hours. It was then treated for recovery of the desired desoxylglycose. There was obtained 4.95 g. (86–87%) of triacetyl-D-xylopyranosylbenzene. Upon crystallization of this from 2-propanol there was obtained 3.9 g. of triacetyl-beta-D-xylopyranosylbenzene (after three crystallizations from 2-propanol, M. P. 168.5–169° C., $(\alpha)_D^{20}$ from chloroform −57.5°, conc. 1.470 g./100 ml. of chloroform) and 0.74 g. of triacetyl-alpha-D-xylopyranosylbenzene ($(\alpha)_D^{20}$ in chloroform −23.0) in sirupy form.

Deacetylation of the triacetyl-beta-D-xylopyranosylbenzene with sodium and methanol yielded beta-D-xylopyranosylbenzene, M. P. 148–148.5° C.

*Example 9.*—*Preparation of p-triacetyl-D-xylopyranosyl)toluene.* This is a duplicate of Example 8 except that 17.8 ml. of p-bromotoluene was used in place of the bromobenzene. There was obtained 4.9 g. (82.3%) of p-(triacetyl-D-xylopyranosyl)toluene, and 3.6 g. of p-(triacetyl-beta-D-xylopyranosyl)toluene which was crystalline. After three crystallizations from 2-propanol, it possessed these constants; M. P. 126° C.; $(\alpha)_D^{20}$ in chloroform −60.2° (conc. 1.230 g./100 ml. of chloroform). The specific rotation of the sirupy alpha anomer was −34.4°.

*Example 10.—Preparation of heptaacetyl-beta-lactopyranosylbenzene.* To the Grignard reagent prepared from 8.65 ml. of bromobenzene and 1.98 g. of magnesium in 35 ml. of absolute ethyl ether was added 3 g. of heptaacetyllactosyl chloride in 100 ml. of absolute ether. This addition was made all at once instead of slowly as in the other examples. The mixture was maintained, with agitation, under reflux conditions for 6 hours. Heptaacetyllactopyranosylbenzene was obtained in 69.4% yield (2.21 g.). The latter was crystallized from ethyl ether and then from 2-propanol. From this there was obtained 1.01 g. of heptaacetyl-beta-lactopyranosylbenzene (after three crystallizations from 2-propanol, M. P. 217° C.; $(\alpha)_D^{20}$ in chloroform −7.5°, conc. 1.140 g./100 ml. of chloroform) and 0.9 g. of heptaacetyl-alpha-lactopyranosylbenzene in the form of a sirup ($(\alpha)_D^{20}$ in chloroform +10.7°).

*Example 11.—Preparation of tetraacetyl-alpha-D-glucopyranosylbenzene.* To the Grignard reagent prepared from 4.7 g. of magnesium and 20 ml. of bromobenzene was added 5 g. of alpha-glucose pentaacetate in 100 ml. of dry ethyl ether. After all of the alpha-glucose pentaacetate had been added the mixture was refluxed for an additional 3 hours. It was then treated in the manner described in preceding examples.

From the water layer was obtained 2.67 g. of tetraacetyl-alpha-D-glucopyranosylbenzene in the form of a sirup. $(\alpha)_D^{20}$ in chloroform was found to be +5.66°. Oxidation of the sirup yielded benzoic acid.

We claim:

1. 1-R-1-desoxyglycoses wherein R represents a radical selected from the group consisting of alkyl, aryl, and aralkyl.

2. 1-R-1-desoxyglucoses wherein R represents a radical selected from the group consisting of alkyl, aryl, and aralkyl.

3. The process which comprises effecting the reaction, under substantially anhydrous conditions, between 2,3,4,6-tetraacetyl-D-glucosyl bromide and phenylmagnesium bromide, the amount of said phenylmagnesium bromide being at least 9 molecular equivalents with respect to the 2,3,4,6-tetraacetyl-D-glucosyl bromide; the time for effecting said reaction being about 5 hours; and the temperature for effecting said reaction not exceeding that obtained by refluxing the reaction mixture on a steam bath.

4. The process which comprises effecting the reaction, under substantially anhydrous conditions, between 2,3,4,6-tetraacetyl-D-glucosyl chloride and n-butylmagnesium bromide, the amount of said n-butylmagnesium bromide being at least 9 molecular equivalents with respect to the 2,3,4,6-tetraacetyl-D-glucosyl chloride; the time for effecting said reaction being about 5 hours; and the temperature for effecting said reaction not exceeding that obtained by refluxing the reaction mixture on a steam bath.

5. The process which comprises effecting the reaction, under substantially anhydrous conditions, between 2,3,4-triacetyl-D-xylosyl chloride and phenylmagnesium bromide, the amount of said phenylmagnesium bromide being at least 7 molecular equivalents with respect to the 2,3,4-triacetyl-D-xylosyl chloride; the time for effecting said reaction being about 5 hours; and the temperature for effecting said reaction not exceeding that obtained by refluxing the reaction mixture on a steam bath.

6. The process which comprises effecting the reaction, under substantially anhydrous conditions, between a tetraacylglucose derivative and a Grignard reagent, said tetraacylglucose derivative being characterized in that to the carbon atom of the aldehyde function there is attached a radical selected from the group consisting of Cl, Br and acyloxy; said Grignard reagent being present in the amount of at least about 9 molecular equivalents with respect to said tetraacylglucose derivative.

7. 1-phenyl-1-desoxy-D-glucose.

8. 1-phenyl-1-desoxy-D-xylose.

9. 1-tolyl-1-desoxy-D-glucose.

10. The process of preparing 1-R-1-desoxyglycoses, wherein R represents a radical selected from the group consisting of alkyl, aryl and aralkyl, which comprises effecting the reaction, under substantially anhydrous conditions, between a glycose derivative and a Grignard reagent, said glycose derivative being characterized in that the carbon atom of the aldehyde function has attached to it a substituent from the group consisting of bromine, chlorine and acyloxy and in that said glycose derivative contains protected hydroxyl groups; the amount of said Grignard reagent being at least about $2x+1$ molecular equivalents with respect to said glycose derivative wherein $x$ is equal to the number of protected hydroxyl groups.

11. The process which comprises effecting the reaction, under substantially anhydrous conditions, between a polyacylglycosyl ester and a Grignard reagent, said Grignard reagent being present in the amount of at least about $2x+1$ molecular equivalents with respect to said polyacylglycosyl ester wherein $x$ is equal to the number of acyl groups.

12. The process according to claim 10 wherein the time for effecting said reaction ranges from about 3 to about 5 hours.

WILLIAM ANDREW BONNER.
CHARLES D. HURD.

REFERENCES CITED

The following references are of record in the file of this patent:

Paal et al.: Ber., v. 39 (1906), pp. 1361, 2823, 2 pages.

Fischer et al.: Ber., v. 45 (1912), pp. 912–914, 3 pages.

Froschl et al.: Monatsh., v. 55 (1930), p. 29, 1 page.